(12) United States Patent
Cypriano et al.

(10) Patent No.: US 12,299,107 B2
(45) Date of Patent: May 13, 2025

(54) SYSTEMS AND METHODS FOR PROXIMITY SINGLE SIGN-ON

(71) Applicant: Apple Inc., Cupertino, CA (US)

(72) Inventors: Felipe Marin Cypriano, San Francisco, CA (US); Marc J. Krochmal, Santa Clara, CA (US); Gokul P. Thirumalai, Mountain View, CA (US); Bob Bradley, San Jose, CA (US); Dmitry V. Belov, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,482

(22) Filed: May 29, 2020

(65) Prior Publication Data
US 2020/0380108 A1    Dec. 3, 2020

Related U.S. Application Data

(60) Provisional application No. 62/856,060, filed on Jun. 1, 2019.

(51) Int. Cl.
*G06F 21/00* (2013.01)
*G06F 21/32* (2013.01)
(Continued)

(52) U.S. Cl.
CPC .............. *G06F 21/35* (2013.01); *G06F 21/32* (2013.01); *G06F 21/33* (2013.01)

(58) Field of Classification Search
CPC ......... G06F 21/32; G06F 21/33; G06F 21/35; H04L 63/10; H04L 63/107; H04L 63/108
See application file for complete search history.

(56) References Cited

U.S. PATENT DOCUMENTS

| 6,668,322 B1 | 12/2003 | Wood et al. |
| 7,188,358 B1 | 3/2007 | Hisada et al. |

(Continued)

FOREIGN PATENT DOCUMENTS

| CA | 2245293 A1 | 9/1999 |
| CN | 1864377 A | 11/2006 |

(Continued)

OTHER PUBLICATIONS

Third-Party Submission under 37 CFR 1.290, date of submission in U.S. Appl. No. 16/888,479, filed May 4, 2021, 2 pages.

(Continued)

*Primary Examiner* — Joseph P Hirl
*Assistant Examiner* — Chi D Nguy
(74) *Attorney, Agent, or Firm* — Kilpatrick Townsend & Stockton LLP

(57) ABSTRACT

A method and apparatus of a device that endorses a proximity authorization for an authorization requesting device is described. In an exemplary embodiment, the device receives a proximity authorization request from the authorization requesting device, wherein the authorization requesting device is in proximity with the authorization endorsing device. The device additionally presents a local authorization request to a user of the authorization endorsing device and receives a set of user credentials for the local authorization request. The device further performs a local authorization on the device using at least the set of user credentials. In addition, the device sends a server authorization request to an identity management server, receives an authorization response from the identity management server, and returns the authorization response.

24 Claims, 9 Drawing Sheets

(51) Int. Cl.
*G06F 21/33* (2013.01)
*G06F 21/35* (2013.01)

(56) References Cited

U.S. PATENT DOCUMENTS

| | | | |
|---|---|---|---|
| 7,345,671 | B2 | 3/2008 | Robbin et al. |
| 7,784,092 | B2 | 8/2010 | Pearson et al. |
| 8,006,098 | B2 | 8/2011 | Aupperle et al. |
| 8,014,756 | B1 | 9/2011 | Henderson |
| 8,689,001 | B1 | 4/2014 | Satish et al. |
| 8,806,196 | B2 | 8/2014 | Metke et al. |
| 8,996,857 | B1 | 3/2015 | Akella et al. |
| 9,130,921 | B2 | 9/2015 | Boubez et al. |
| 9,202,218 | B1 | 12/2015 | Crisman et al. |
| 9,203,829 | B1 | 12/2015 | Levine et al. |
| 9,582,802 | B2 | 2/2017 | Bachenheimer et al. |
| 9,756,000 | B1 | 9/2017 | Paulramachandran et al. |
| 9,792,426 | B1 | 10/2017 | Driscoll et al. |
| 9,935,942 | B2 | 4/2018 | Kim et al. |
| 10,243,945 | B1 | 3/2019 | Kruse et al. |
| 10,671,688 | B2 | 6/2020 | Nakashima |
| 10,701,067 | B1* | 6/2020 | Ziraknejad ............ H04W 12/63 |
| 11,361,107 | B2 | 6/2022 | Roundtree |
| 11,601,419 | B2 | 3/2023 | Ryu et al. |
| 2001/0055388 | A1 | 12/2001 | Kaliski |
| 2004/0193915 | A1 | 9/2004 | Smith et al. |
| 2004/0205176 | A1 | 10/2004 | Ting et al. |
| 2004/0224638 | A1 | 11/2004 | Fadell et al. |
| 2005/0198173 | A1 | 9/2005 | Evans |
| 2005/0198537 | A1 | 9/2005 | Rojewski |
| 2006/0053296 | A1 | 3/2006 | Busboom et al. |
| 2006/0218025 | A1 | 9/2006 | Miller et al. |
| 2007/0011245 | A1 | 1/2007 | Kawashima et al. |
| 2007/0299920 | A1 | 12/2007 | Crespo et al. |
| 2008/0072301 | A1 | 3/2008 | Chia et al. |
| 2010/0043065 | A1 | 2/2010 | Bray et al. |
| 2010/0077469 | A1 | 3/2010 | Furman et al. |
| 2010/0257578 | A1 | 10/2010 | Shukla et al. |
| 2011/0010425 | A1 | 1/2011 | Bernatz |
| 2011/0010762 | A1 | 1/2011 | Nijdam et al. |
| 2011/0231502 | A1 | 9/2011 | Umeshima et al. |
| 2011/0246593 | A1 | 10/2011 | Crespo et al. |
| 2012/0102326 | A1 | 4/2012 | Palekar |
| 2012/0151210 | A1* | 6/2012 | Perez .................... H04L 9/3231 713/168 |
| 2013/0067568 | A1 | 3/2013 | Obasanjo et al. |
| 2013/0080775 | A1 | 3/2013 | Liebmann et al. |
| 2013/0198823 | A1 | 8/2013 | Hitchcock et al. |
| 2014/0046792 | A1 | 2/2014 | Ganesan |
| 2014/0059658 | A1 | 2/2014 | Stecher |
| 2014/0059693 | A1 | 2/2014 | Stecher |
| 2014/0189808 | A1 | 7/2014 | Mahaffey et al. |
| 2014/0189839 | A1 | 7/2014 | Jezek |
| 2014/0230027 | A1 | 8/2014 | Cha et al. |
| 2014/0236846 | A1 | 8/2014 | Melika et al. |
| 2014/0237553 | A1 | 8/2014 | Feuer et al. |
| 2014/0282919 | A1 | 9/2014 | Mason |
| 2014/0282980 | A1 | 9/2014 | Kolluru et al. |
| 2014/0298413 | A1 | 10/2014 | Anderson et al. |
| 2014/0298432 | A1* | 10/2014 | Brown .................... G06F 21/34 726/6 |
| 2014/0366154 | A1 | 12/2014 | Van et al. |
| 2015/0081552 | A1* | 3/2015 | Stewart ............ G06Q 20/3226 705/44 |
| 2016/0234343 | A1 | 8/2016 | Fausak et al. |
| 2016/0359863 | A1 | 12/2016 | Krstic et al. |
| 2016/0366119 | A1 | 12/2016 | Rykowski et al. |
| 2016/0366122 | A1 | 12/2016 | Rykowski et al. |
| 2016/0380957 | A1 | 12/2016 | Gupta et al. |
| 2017/0163636 | A1 | 6/2017 | Nishida |
| 2017/0339151 | A1* | 11/2017 | Van Os .................. G06Q 20/12 |
| 2018/0063129 | A1* | 3/2018 | Aigner ............... H04L 63/0853 |
| 2018/0091490 | A1 | 3/2018 | Wang et al. |
| 2018/0145968 | A1 | 5/2018 | Rykowski et al. |
| 2018/0152440 | A1 | 5/2018 | Hande et al. |
| 2018/0288030 | A1* | 10/2018 | Witrisna ............... H04W 12/06 |
| 2019/0058707 | A1 | 2/2019 | Chung et al. |
| 2019/0132280 | A1 | 5/2019 | Meuninck et al. |
| 2019/0253251 | A1 | 8/2019 | Kobayashi |
| 2019/0297089 | A1* | 9/2019 | Bryant .................... G01S 11/06 |
| 2020/0067907 | A1* | 2/2020 | Avetisov ................ H04L 63/12 |
| 2020/0137038 | A1 | 4/2020 | Endler |
| 2020/0137052 | A1 | 4/2020 | Sunkavally et al. |
| 2020/0153814 | A1 | 5/2020 | Smolny et al. |
| 2020/0382455 | A1 | 12/2020 | Fasoli et al. |
| 2020/0382495 | A1 | 12/2020 | Belov et al. |
| 2021/0073359 | A1 | 3/2021 | Boodaei et al. |
| 2021/0194883 | A1 | 6/2021 | Badhwar et al. |
| 2021/0374226 | A1 | 12/2021 | Mondello et al. |

FOREIGN PATENT DOCUMENTS

| | | |
|---|---|---|
| CN | 102224493 A | 10/2011 |
| CN | 103918000 A | 7/2014 |
| EP | 2575315 A1 | 4/2013 |
| EP | 2756471 A1 | 7/2014 |
| GB | 2503704 A | 1/2014 |
| JP | 2002-281089 A | 9/2002 |
| JP | 2016-004406 A | 1/2016 |
| WO | 2013/038190 A1 | 3/2013 |
| WO | 2014105263 A1 † | 7/2014 |
| WO | 2020/039327 A1 | 2/2020 |

OTHER PUBLICATIONS

Third Party Submission under 37 CFR 1.290—Concise Description of Relevance, date of submission in U.S. Appl. No. 16/888,479, filed May 4, 2021, 2 pages.
Observations by third parties received for European Patent Application No. 20746467.8, mailed on May 4, 2021, 15 pages.
PCT International Preliminary Report on Patentability for PCT/US2021/034463, mailed Dec. 15, 2022, 13 pages.
PCT International Search Report and Written Opinion of the International Searching Authority for PCT/US2021/034463, mailed Jul. 30, 2021, 19 pages.
Apple, "Support Universal Links", Web Archive, Retrieved from <https://web.archive.org/web/20180728030641/https://developer.apple.com/library/archive/documentation/General/Conceptual/AppSearch/UniversalLinks.html>, Retrieved on Jul. 28, 2018, 4 pages.
Concise Description of Relevance under 35 USC 1.22(e) for U.S. Appl. No. 16/888,479, submitted Jun. 2, 2021, 10 pages.
Facebook, "Login for iOS", Web Archive, Retrieved from <https://web.archive.org/web/20131210005218/https://developers.facebook.com/docs/ios/login/>, Retrieved on Dec. 10, 2013, 5 pages.
Gmail, "Automatically forward Gmail messages to another account", Web Archive, Retrieved from <https://web.archive.org/web/20190203105529/https://support.google.com/mail/answer/10957?hl=en>, Retrieved on Feb. 3, 2019, 3 pages.
Gmail, "Email receiving limits", Web Archive, Retrieved from <https://web.archive.org/web/20181119034429/https://support.google.com/a/answer/1366776?hl=en>, Retrieved on May 4, 2021, 2 pages.
International Preliminary Report on Patentability received for PCT Patent Application No. PCT/US2020/035557, mailed on Dec. 16, 2021, 12 pages.
International Preliminary Report on Patentability received for PCT Patent Application No. PCT/US2020/035593, mailed on Dec. 16, 2021, 8 pages.
International Search Report and Written Opinion received for PCT Patent Application No. PCT/US2020/035557, mailed on Nov. 2, 2020, 16 pages.
International Search Report and Written Opinion received for PCT Patent Application No. PCT/US2020/035593, mailed on Aug. 27, 2020, 9 pages.
Max Weinbach, "Android P adds new Biometrics API that supports iris, face, and fingerprint scanning", Web Archive, Retrieved from <https://web.archive.org/web/20181122134553/https://www.xda-developers.com/android-p-new-biometrics-api/>, Retrieved on Nov. 22, 2018, 8 pages.

(56) References Cited

OTHER PUBLICATIONS

Office Action received for Chinese Patent Application No. 202080040650.2, mailed on Nov. 1, 2022, 18 pages (9 pages of English Translation and 9 pages of Original Document).
PCT Invitation to Pay Additional Fees And, Where Applicable, Protest Fee, for PCT/US2020/035557, mailed Sep. 10, 2020, 13 pages.
PCT Third Party Observation for PCT/US2020/035557, date of submission Apr. 10, 2021, 6 pages.
PCT Third Party Observation for PCT/US2020/035593, date of submission Mar. 6, 2021, 2 pages.
PCT Third Party Observation for PCT/US2020/035593, date of submission May 4, 2021, 4 pages.
Rick Fillion, "Developers: How we use SRP, and you can too", Web Archive, Retrieved from <https://web.archive.org/web/20190117084628/https://blog.1password.com/developers-how-we-use-srp-and-you-can- too/>, Feb. 14, 2018, 6 pages.
Shevek, "The Sender Rewriting Scheme", Web Archive, Retrieved from <https://web.archive.org/web/20190217091357/https://www.libsrs2.org/srs/srs.pdf>, Jun. 5, 2004, pp. 1-9.
Stackoverflow, "Native Facebook Login experience via browser", Web Archive, Retrieved from <https://web.archive.org/web/20150927002840/https://stackoverflow.com/questions/20943499/native-facebook-login- experience-via-browser>, Retrieved on Sep. 27, 2015, 2 pages.
Stackoverflow, "Use Facebook APP Authentication to automatically login to Mobile Website", Web Archive, Retrieved from <https://web.archive.org/web/20150325191219/http://stackoverflow.com/questions/7716883/use-facebook-app-authentication-to-automatically-login-to-mobile-website>, Retrieved on Mar. 25, 2015, 2 pages.
Third-Party Submission Under 37 CFR 1.290 received for U.S. Appl. No. 16/888,461, mailed on Apr. 8, 2021, 5 pages.
Third-Party Submission under 37 CFR 1.290, Concise Description of Relevance, for U.S. Appl. No. 16/888,479, submitted Jun. 2, 2021, 10 pages.
Trashmail.com, "Features", Web Archive, Retrieved from <https://web.archive.org/web/20180904133419/https://trashmail.com/?cmd=features&lang=en>, Retrieved on May 4, 2021, 3 pages.
Trashmailservice, "TrashMail.net Tutorial Firefox Add-on Demo", Retrieved from <https://www.youtube.com/watch?v=NyTbXctxhRs>, Relevance: At 3:47, you can see that the "from" address and "To" addresses are embedded in the Reply-To address for reply processing, Relevant to claims: Claims 18-20, Nov. 22, 2009, 3 pages.
Virulhagiri Thirumavalavan, "Flowcharts", Retrieved from <https://www.dombox.org/flowcharts.pdf>, Retrieved on Feb. 17, 2019, Most relevant passage of drawings: Fig. 608 to Fig. 614, pp. 23 to 28, Relevant to claims: All claims, 32 pages.
Viruthagiri Thirumavalavan, "A Spamless Internet", Github Medium NANOG, Retrieved from <https://www.dombox.org/dombox.pdf>, Feb. 2019, pp. 1-299.
Viruthagiri Thirumavalavan, "Dombox - The Zero Spam Mail System", Web Archive, Retrieved from <https://web.archive.org/web/20190217053110/https://medium.com/@Viruthagiri/dombox-the-zero-spam-mail- system-2b08ff7432cd>, Feb. 16, 2019, 52 pages.
Youtube, "Facebook added Face Recognition | Facial Biometric Data | Facebook feature 2018", 0:50-0:54, Available Online on <https://www.youtube.com/watch?v=i04vtKAdOrU>, Feb. 16, 2018, 3 pages.
Second Office Action received for Chinese Patent Application No. 202080040650.2, mailed on Jun. 19, 2023, 8 pages (5 pages of English Translation and 3 pages of Original Document).
Non-Final Office Action received for U.S. Appl. No. 16/888,461, mailed on Nov. 6, 2023, 12 pages.
Notice of Allowance received for U.S. Appl. No. 18/153,118, mailed on Nov. 22, 2023, 9 pages, Apr. 6, 2024.
Notification to Grant Patent Right for Invention received for Chinese Patent Application No. 202080040650.2, mailed on Jun. 10, 2024, 8 pages (2 pages of English Translation and 6 pages of Original Document).
Notice of Allowance received for U.S. Appl. No. 16/888,461, mailed on Mar. 6, 2024, 5 pages.
Office Action received for Chinese Patent Application No. 202080040650.2, mailed on Apr. 18, 2024, 7 pages (4 pages of English Translation and 3 pages of Original Document).
Third Office Action received for Chinese Patent Application No. 202080040650.2, mailed on Jan. 15, 2024, 13 pages (6 pages of English Translation and 7 pages of Original Document).
U.S. Appl. No. 18/405,858, Non-Final Office Action, Mailed On Feb. 21, 2025, 14 pages.
Third Party Submission—Concise Description of Relevance for 16888479, date of submission Apr. 27, 2021, 10 Pages.†

\* cited by examiner
† cited by third party

SYSTEMS AND METHODS FOR PROXIMITY SINGLE SIGN-ON

This application claims the benefit of priority of U.S. Provisional Patent Application No. 62/856,060, filed on Jun. 1, 2019, which is incorporated herein by reference in its entirety to provide continuity of disclosure.

FIELD OF INVENTION

This invention relates generally to user authorization and more particularly to a proximity single sign-on.

BACKGROUND OF THE INVENTION

A single sign-on service is a service that allows a user to use a single set of credentials to sign-on to multiple services across one or more authorization domains. For example, a user could use a single username and password combination to sign-on for media streaming service from one company and a social media account from another company, even though these two companies are in different authorization domains. In this embodiment, having a single sign-on service for multiple services over multiple authorization domains allows a user to remember to provide a single set of credentials for a variety of services from a variety of sources. Typically, when a user wishes to sign-on first service (e.g., launching an application for the first time, re-logging into an application, accessing a service through a web interface, accessing a service through digital media player, and/or another scenario in which the user is presented with an interface to authenticate with the service), the user is presented a user interface that displays a native sign-on user interface for the first service and a single sign-on user interface (e.g., "connect with XYZ").

A problem with single sign-on services is that the entity providing the single sign-on user service will share a user's private information with the individual service providers. Often, the sharing of private information is done without the user knowing how this private information sharing works. For example, the user may unwittingly share, via the single sign-on service, how often the user is using one or more applications, the user's real name, the user's real email address, and/or other private information with the service provider that allows their service to be authorized through the single sign-on service. In addition, the user will need to provide the set of credentials using the component resources of the device that is to execute the application. This can lead to a limited set of resources for the user to input the user credentials (e.g. lacking a biometric receiver or even a keyboard).

SUMMARY OF THE DESCRIPTION

A method and apparatus of a device that that endorses a proximity authorization for an authorization requesting device is described. In an exemplary embodiment, the device receives a proximity authorization request from the authorization requesting device, wherein the authorization requesting device is in proximity with the authorization endorsing device. The device additionally presents a local authorization request to a user of the authorization endorsing device and receives a set of user credentials for the local authorization request. The device further performs a local authorization on the device using at least the set of user credentials. In addition, the device sends a server authorization request to an identity management server, receives an authorization response from the identity management server, and returns the authorization response.

In one embodiment, a machine-readable medium having executable instructions to cause one or more processing units to perform a method to endorse a proximity authorization for an authorization requesting device is described. In an exemplary embodiment, the machine-readable medium method receives a proximity authorization request from the authorization requesting device, wherein the authorization requesting device is in proximity with the authorization endorsing device. The machine-readable medium method additionally presents a local authorization request to a user of the authorization endorsing device and receives a set of user credentials for the local authorization request. The machine-readable medium method further performs a local authorization on the authorization endorsing device using at least the set of user credentials. In addition, the machine-readable medium method sends a server authorization request to an identity management server, receives an authorization response from the identity management server, and returns the authorization response.

In a further embodiment, the authorization requesting device is in proximity with the authorization endorsing device when the authorization requesting device is within a geographic proximity to the authorization endorsing device. In addition, the authorization requesting device is a device that is executing an application requesting an authorization for a service. Furthermore, the proximity authorization request is an authorization request associated with the application. The authorization endorsing device, additionally, is a device that includes a component for receiving the user credentials from the user and the user credentials are selected from the group consisting of biometric user credentials or a username and password.

In one embodiment, the authorization endorsing device is a mobile device and the authorization requesting device is selected from the group consisting of a digital media player, gaming console, laptop, television, smart device, wearable, mobile device, and vehicle component. In a further embodiment, the authorization response includes at least one of an authorization code and an identity token and the server authorization request is a secure remote password authorization request. In addition, each of the authorization requesting device and the authorization endorsing device are associated with a user identity.

In a further embodiment, a machine-readable medium having executable instructions to cause one or more processing units to perform a method to request a proximity authorization by an authorization requesting device. In an exemplary embodiment, the machine-readable medium method receives an application sign-on request and searches for an authorization endorsing device in proximity with the authorization requesting device. The machine-readable medium method further sends a proximity authorization request to the authorization endorsing device and receives a proximity authorization response.

In one embodiment, a method to endorse a proximity authorization for an authorization requesting device is described. In an exemplary embodiment, the method receives a proximity authorization request from the authorization requesting device, wherein the authorization requesting device is in proximity with the authorization endorsing device. The method additionally presents a local authorization request to a user of the authorization endorsing device and receives a set of user credentials for the local authorization request. The method further performs a local authorization on the authorization endorsing device using at least the set of user credentials. In addition, the method sends a server authorization request to an identity management server, receives an authorization response from the identity management server, and returns the authorization response.

In a further embodiment, the authorization requesting device is in proximity with the authorization endorsing device when the authorization requesting device is within a geographic proximity to the authorization endorsing device. In addition, the authorization requesting device is a device that is executing an application requesting an authorization for a service. Furthermore, the proximity authorization request is an authorization request associated with the application. The authorization endorsing device, additionally, is a device that includes a component for receiving the user credentials from the user and the user credentials are selected from the group consisting of biometric user credentials or a username and password.

In one embodiment, the authorization endorsing device is a mobile device and the authorization requesting device is selected from the group consisting of a digital media player, gaming console, laptop, television, smart device, wearable, mobile device, and vehicle component. In a further embodiment, the authorization response includes at least one of an authorization code and an identity token and the server authorization request is a secure remote password authorization request. In addition, each of the authorization requesting device and the authorization endorsing device are associated with a user identity.

In a further embodiment, a method to request a proximity authorization by an authorization requesting device. In an exemplary embodiment, the method receives an application sign-on request and searches for an authorization endorsing device in proximity with the authorization requesting device. The method further sends a proximity authorization request to the authorization endorsing device and receives a proximity authorization response.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 2 is an illustration of one embodiment of a flow for proximity single sign-on.

FIGS. 5A-C are illustrations of embodiments of a user interface on the authorization endorsing device for a proximity sign-on.

FIG. 8 is a flow diagram of one embodiment of a process to handle a user sign on.

DETAILED DESCRIPTION

Figure 1:
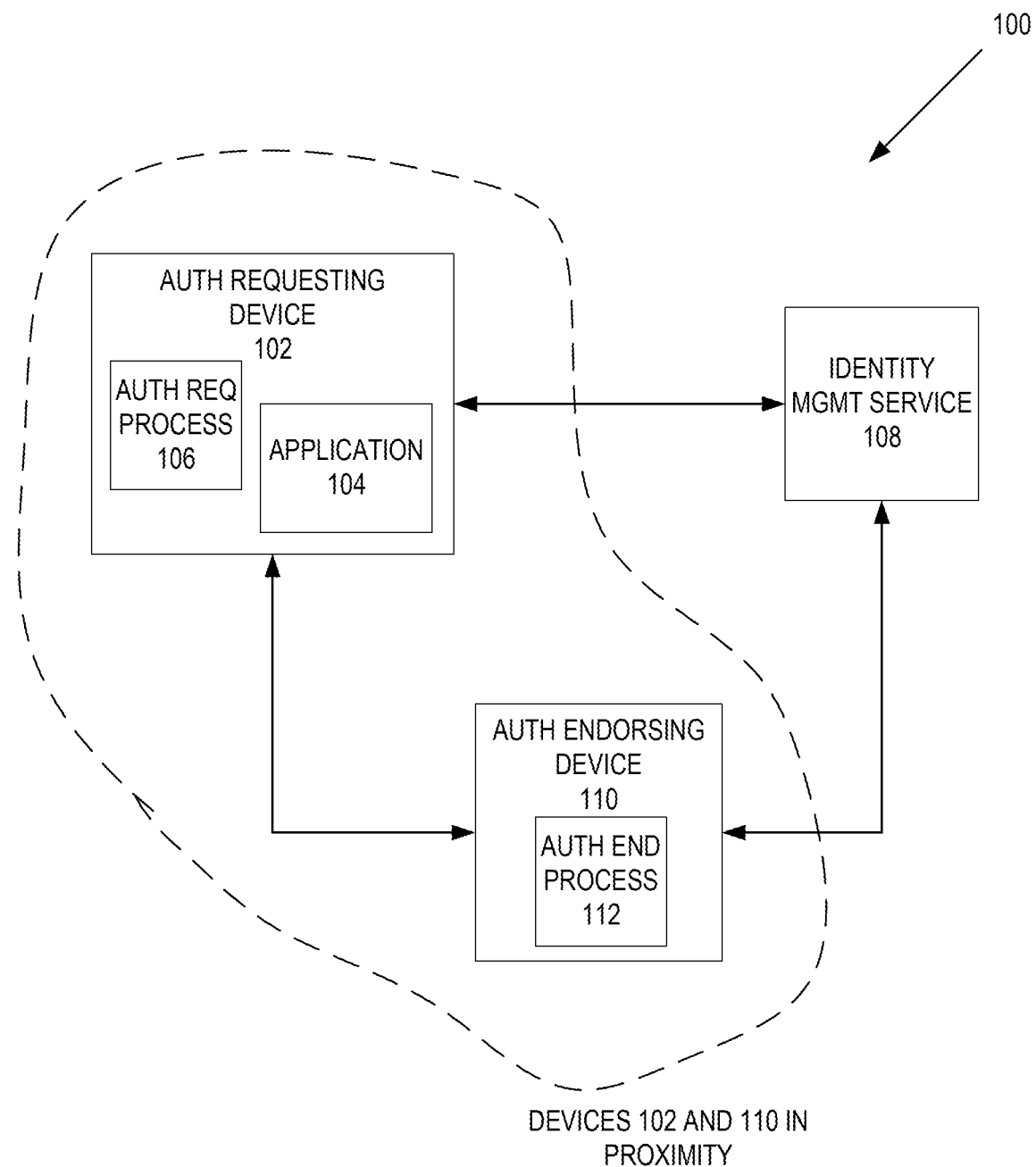
FIG. 1 is an illustration of one embodiment of a system that allows a proximity single sign-on from an authorization endorsing device to an authorization requesting device.

A method and apparatus of a system that endorses a proximity authorization for an authorization requesting device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a system that that endorses a proximity authorization for an authorization requesting device is described. In one embodiment, a single sign-on service is a service that allows a user to use a single set of credentials to sign-on to multiple services across one or more authorization domains. For example, a user could use a single username and password combination (or another set of user credentials) to sign-on for media streaming service from one company and a social media account from another company, even though these two companies are in different authorization domains. In this embodiment, having a single sign-on service for multiple services over multiple authorization domains allows a user to remember just a single set of credentials for a variety of services from a variety of sources. Typically, when a user wishes to sign-on first service (e.g., launching an application for the first time, re-logging into an application, accessing a service through a web interface, accessing a service through digital media player, and/or another scenario in which the user is presented with an interface to authenticate with the service), the user is presented a user interface that displays a native sign-on user interface for the application and a single sign-on user interface (e.g., "connect with XYZ").

A problem with single sign-on services is that the entity providing the single sign-on user service will share a user's private information with the individual service providers. Often, the sharing of private information is done without the user knowing about how this private information sharing works. For example, the user may unwittingly share, via the single sign-on service, how often the user is using one or more applications, the user's real name, the user's real email address, and/or other private information with the service provider that allows their service to be authorized through the single sign-on service.

In one embodiment, a new single sign-on service allows the user to sign-on with different services across different authorization domains using a single set of credentials and without sharing the private information unless the user explicitly authorizes this private information sharing. In this embodiment, for the new single sign-on service, the user is associated with a user identifier that can be used to authenticate a user and authorize the user and/or the user's devices to use one or more services across multiple authorization domains. In addition, the user can control what information is shared with these service providers. In one embodiment, each of the user's devices is a trusted device. In a further embodiment, the user's device is trusted because each of the devices has been signed into using an elevated trusted mechanism, such as two factor authentication. For example and in one embodiment, a trusted device is a device that the authorization domain knows is a user device for a user and that can be used to verify a user's identity.

In one embodiment, an authorization domain is a collection of one or more services and/or authorization mechanism(s) that allow a user to be authorized for the one or more of the services provided by authorization domain using the authorization mechanism(s) of that authorization domain. In addition, one or more user devices associated with a user can be authorized for the one or more authorization services using these authorization mechanism(s). In one embodiment, each user is associated with a unique identifier (e.g., the user identifier) that can be used across the authorization domain. For example and in one embodiment, an authorization domain can be used by a user and/or the user's device(s) to purchase applications, purchase and/or stream media, store content in a cloud storage, access social media, and/or other types of services.

In one embodiment, the new single sign-on service provides a single sign-on for multiple services provided by a native application on the user's device or through a web browser across multiple authorization domains. An example of this single sign-on service is illustrated in U.S. patent application Ser. No. 16/888,479, entitled "SYSTEMS AND METHODS OF APPLICATION SINGLE SIGN-ON", filed on May 29, 2020, which is incorporated by reference. This allows a user to sign-onto different applications and/or services with the user's identifier without exposing the user identifier (and/or other private information) to the developers or providers of the different applications and/or services.

In addition, the new single sign-on service provides for a proximity single sign-on on a first device, where a second user device allows a user to enter a set of credentials identifying the user so as to authorize a service on that first device.

Furthermore, the new single sign-on service can protect a user's real email address by providing an anonymous email relay. This anonymous email relay is used to hide a user's real email address between the user and one of the service providers (e.g., a developer of an application that the user signed on to using the new single sign-on service). The single sign-on service, in one embodiment, allows a user to remember only the user identifier across many different applications and the user can get email from a third party developer without exposing the user's identifier info through the email account set up for the user and that developer.

Moreover, the new single sign-on service provides a real user indicator to the service providers using a privacy preserving machine learning risk assessment system that allows that service provider to forgo using other mechanisms for indicating a real user is using their service (e.g., allowing the service provider to forgo using an extra user verification step such as a completely automated public Turing test to tell computers and humans apart (CAPTCHA) mechanism). An example of an anonymous email relay is illustrated in U.S. patent application Ser. No. 16/888,461 entitled "SYSTEMS AND METHODS OF AN ANONYMOUS EMAIL RELAY", filed on May 29, 2020, which is incorporated by reference.

In addition, the new single sign-on service allows a user to use a user identifier associated with one authorization domain for signing on with applications and/or services of other authorization domains, where the user identifier and/or the user device are not part of the other authorization domains. In one embodiment, the user can sign-on to one or more applications that are part of authorization domains $A_1, \ldots, A_n$ using the user identifier that is part authorization domain B. This sign-on service enables the use of the applications on one or more of the user's devices, without revealing the user identifier or other private information to the developers or providers of those applications. In addition, the user identifier can be used for signing onto one or more applications that are part of the authorization domain B.

FIG. 1 is an illustration of one embodiment of a system 100 that allows a proximity single sign on from an authorization endorsing device 110 to an authorization requesting device 102. In FIG. 1, an authorization requesting device 102 is coupled through a local network to an authorization endorsing device 110. In one embodiment, the authorization requesting device 102 is digital media player, gaming console, laptop, television, smart device, wearable, mobile device, smart speaker, health monitor, vehicle component, and/or any other device that can be used to request an authorization. The authorization request can be for a media streaming service, a game, media access, cloud service, signing onto an application and/or any other type of service that can be provided by the application 104. In this embodiment, the authorization endorsing device 110 is a mobile device, wearable, personal computer, and/or any other device that can be used to process authorization requests.

In one embodiment, the authorization requesting device 102 is a device that is executing an application 104 that requires an authorization before this application 104 can provide the service for the user. For example and in one embodiment, the authorization requesting device 102 is a digital media player connected up to a television, where this digital media player that can stream media from a media service provider and forward the streaming media to the television for presentation. The user would have an account with the media service provider, and the user would enter a set of credentials (e.g., username and password) before the media service provider streams the media to the digital media player. In this example, if the media service provider was part of the single sign-on service, the user could present their set of credentials for single sign on to the digital media player or to the identity management service to allow for access to the service. However, the digital media player may not have sufficient hardware resources (e.g., lacking a biometric receiver such as a fingerprint receiver, face image receiver, sensors, or even a keyboard) that allows the user to easily input their set of user credentials.

In a further embodiment, the authorization requesting process checks an authorization cache (not illustrated) on the authorization requesting device 102 to determine if the application 104 is authorized on this or another device or if the application needs to be authorized at all. In one embodiment, the authorization cache includes information that allows the authorization process 106 to check if the application needs authorization. In this embodiment, the authorization cache can include a list of applications that require authorizations. Furthermore, the authorization cache can include one or more authorization tokens for applications that have been previously been authorized. Thus, the authorization process can check to see if the applications needs or have been previously been authorized. In addition, because the authorization cache is on-device, these checks can be done on-device, this check is not done with a server. In one embodiment, this can keep these authorization checks private as remote authorization checks are not needed.

Alternatively, the user may prefer to use the authorization endorsing device 110 for authorization as a personal preference or the authorization requesting device 102 be in an inconvenient location.

In one embodiment, the authorization requesting device 102 can advertise its presence using a discovery service. In this embodiment, the discovery service can be used to advertise to other devices that are in proximity with the authorization requesting device 102 that the authorization requesting device 102 as requesting authorization for a service (e.g., application 104). In one embodiment, this is a two-step process. In the first step, the authorization requesting device 102 can advertise its presence using a discovery protocol (e.g., SSDP, Bonjour, and/or another discovery protocol). The authorization endorsing device 110 can discover the authorization requesting device 102 via the discovery protocol from the authorization requesting device 102 advertisements. In one embodiment, the authorization requesting device 102 is in proximity with the authorization endorsing device 110 when the authorization requesting device is within a geographic proximity to the authorization endorsing device 110. According to some embodiments, the wireless communications components can specify a requisite signal strength threshold to be satisfied in order to establish a proximity requirement for the authorization endorsing device 110 to communicate with one another. For example, the requisite signal strength threshold can be associated with a fixed and/or an adjustable Received Signal Strength Indication (RSSI) level. In response to determining that the signal strength of the request satisfies the RSSI level, the wireless communications components can indicate to the authorization endorsing device 110 that a request is received from an authorization requesting device 102. By monitoring the signal strength of the request, the authorization requesting device 102 can provide enhanced granularity in presenting relevant notifications at the authorization requesting device 102 that satisfy the RSSI level. This beneficially prevents authorization requesting devices 102 that are not near the authorization endorsing device 110 from burdening users with unwanted or irrelevant requests. In one embodiment, the authorization endorsing device 110 is a trusted device that the authorization domain knows is a user device for a user and that can be used to verify a user's identity.

In one embodiment, the authorization endorsing device 110 discovers the authorization requesting device 102 and responds to the authorization requesting device 102 with a response that states the authorization endorsing device 110 can endorse an authorization for the authorization requesting device 102 for an unidentified application. In this embodiment, the application is unknown at this point, as the authorization requesting device 102 advertises an action type of "application sign in." If there are multiple potential authorization endorsing device 110 that are in proximity with the authorization requesting device 102 (e.g., a user has a smartphone and a tablet in proximity with a digital media player), the first device that responds to the advertisement to the authorization requesting device 102 assumes the role of the authorization endorsing device 110 for the authorization requesting device 102. In one embodiment, each device in proximity can display a banner on that device's screen. If a user taps on that banner, then the first device that responds to the authorization requesting device 102 becomes the authorization endorsing device 110.

Figure 5A:
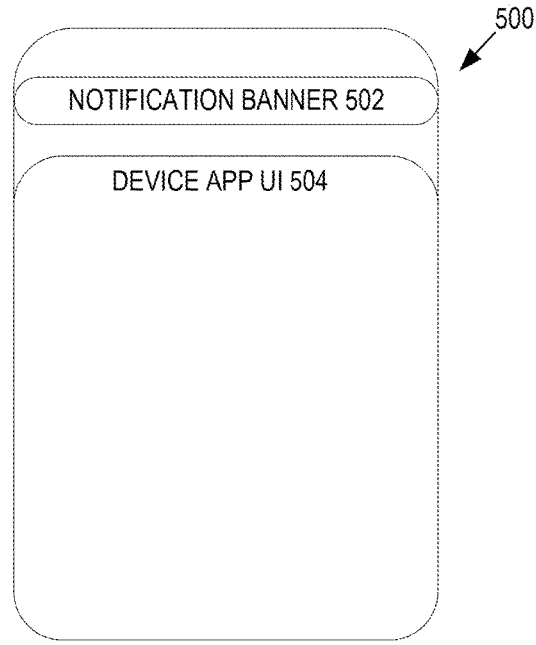
Figure 5B:
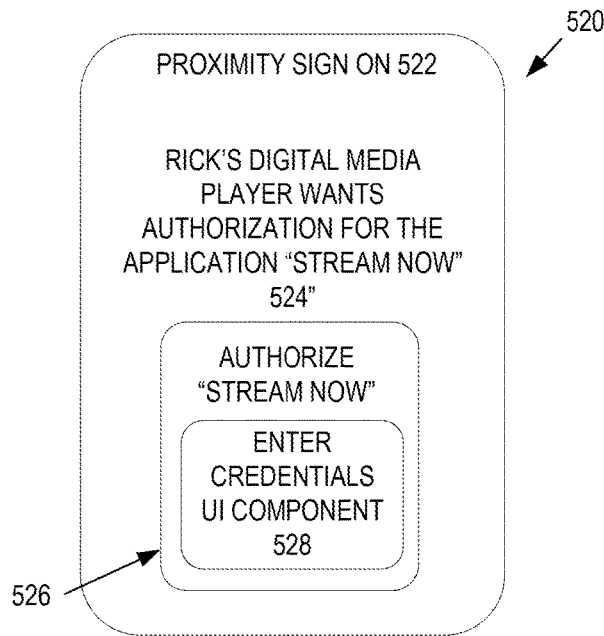
Figure 5C:

In the second step, the authorization requesting device 102 sends information that is used by authorization endorsing device 110 to proceed with the authorization. In one embodiment, the authorization requesting device 102 sends an application developer identifier, an application name, an icon, and/or other information that is used by the authorization endorsing device 110 present the authorization user interface to the user. An example authorization user interface is illustrated in FIGS. 5A-C below.

If the authorization requesting device 102 and the authorization endorsing device 110 are both trusted devices with the same user account in the authorization domain, the successful authorization endorsing device 110 creates a secure channel with the authorization requesting device 102. In one embodiment, the authorization requesting device 110 includes an authorization requesting process 112 that performs the authentication and authorization functions of authorization requesting device 110 described above. If the authorization requesting device 102 and the authorization endorsing device 110 are not both trusted devices with the same user account in the authorization domain, the authorization requesting device 102 can display a personal identification number (PIN) that the user enters on the authorization endorsing device 110, before the secure channel is created. By requiring a PIN to entered, the authorization endorsing device 110 and authorization requesting device 102 can be tied to different global user identifiers. In one embodiment, this allows a friend's device to be the authorization endorsing device 110 for a user's authorization requesting device 102.

In a further embodiment, the discovery between the authorization requesting device 102 and authorization endorsing device 110 can be performed over a variety of networks (e.g., Bluetooth, Near Field Communication (NFC), WiFi, Ultra-wideband (UWB), cellular components, an ad hoc network (e.g., AIRPLAY, etc.), and/or another type of network). In one embodiment, the authorization endorsing device 110 and the authorization requesting device 102 create a secure channel as described in U.S. Patent Publication No. 2019/0124049, entitled "Secure Device to Device Communication Channel," filed Sep. 28, 2018, which is incorporated by reference.

After the authorization endorsing device 110 and the authorization requesting device 102 create the secure channel, in one embodiment, the authorization requesting device 102 sends a proximity authorization request to the authorization endorsing device 110. In one embodiment, the communications with the identity management server and/or the authorization requesting device 102 can be over Wi-Fi or some other communications type. In response, the authorization endorsing device 110 can perform a local user authentication by presenting an authentication user interface to a user. In this embodiment, the authorization endorsing device 110 presents an authentication user interface the prompts a user to enter their user credentials (e.g., biometric credentials (e.g., fingerprint, face identifier, or another biometric credential), username and password, and/or another type of user credential). For example and in one embodiment, authorization endorsing device 110 presents an authentication user interface that requests the user to sign-on for the application 104 using single sign-on the authorization requesting device 102. In addition and in this example, the authorization requesting device 102 can present to the user to look for the authorization endorsing device 110 to sign-on for the application 104.

In one embodiment, each of the authorization requesting device 102 and authorization endorsing device 110 are associated with a global user identifier. In this embodiment, the user identifier can be used in the single sign-on process as described above.

In response to the authorization user interface being presented on the authorization endorsing device 110, the user enters the credentials. With the received user credentials, the authorization endorsing device 110 can perform a local user authentication using the authentication components that are part of the authorization endorsing device 110. For example and in one embodiment, the authorization endorsing device 110 receives a face identifier and performs a local user authentication using the face identifier. In this example, a biometric sensor is used for facial recognition to gather data for a comparison with a template in secure hardware. In one embodiment, by performing the local user authentication, the authorization endorsing device 110 is determining that the user interacting with the authorization endorsing device 110 is known to the authorization endorsing device 110.

If the authorization endorsing device 110 is successful with the local user authentication, the authorization endorsing device 110 sends a server authorization request to the identity management service 108. In one embodiment, the server authorization is used to authenticate the user and to authorize the device for the requested application if the user has not set up an anonymous used identifier for this application or developer of this application. In this embodiment, the authorization endorsing device 110 sends a secure remote protocol (SRP) request to the identity management service 108 with access continuation parameter. In one embodiment, the authorization endorsing device 110 is trusted based on a two-factor authentication for the device. As a result of the two-factor authentication, the authorization endorsing device 110 receives an access continuation parameter, which can be used in the SRP request to the identify management service 108. In one embodiment, the access continuation parameter allows the authorization endorsing device 110 to access an account associated with the user without having the authorization endorsing device 110 provide the user's set of credentials. an access continuation parameter and token is described in U.S. Patent Publication No. 2016/0359863, entitled "Account Access Recovery System, Method and Apparatus," filed Sep. 30, 2015.

In response to receiving the SRP request, the identity management service 108 authenticates the user using the received access continuation parameter and returns an authorization response includes an authorization code and a token. In some embodiments, the identity management service 108 may provide an attestation that the authorization endorsing device 110 is an authorization endorsing device 110 from a particular manufacturer with particular security hardware present on the device (e.g., secure hardware, biometric authentication hardware/sensors) that may be provided to the application.

In a further embodiment, the authorization endorsing device 110 returns the authorization response to the authorization requesting device 102. In this embodiment, the authorization endorsement process 112 returns the authorization response to the authorization requesting process 106. The authorization requesting process 106 returns the authorization response to the application 104, where the application 104 indicates to the user that the sign-on complete. In one embodiment, the application 104 receives one or more identifiers that are used by the application when executing.

As described above, authorization requesting device 102 can use an endorsing device (e.g., a device in proximity, such as the authorization endorsing device 110) to authenticate the user and authorize the use of the application by utilizing the resources of the endorsing device. This allows the requesting device to get authorization for a service and/or application without having the requisite authentication or authorization hardware and/or software resources that may be present on the endorsing device. In addition, the user can use the authentication techniques that are known to the user of the endorsing device without having to remember the separate authentication techniques for each application on the requesting device.

In one embodiment, the authorization requesting device 102 and/or the authorization endorsing device 110 can include an application authorization cache as described in FIG. 6 below. In this embodiment, the application authorization cache can be used to cache authorization information for the application needing authorization.

Figure 2:
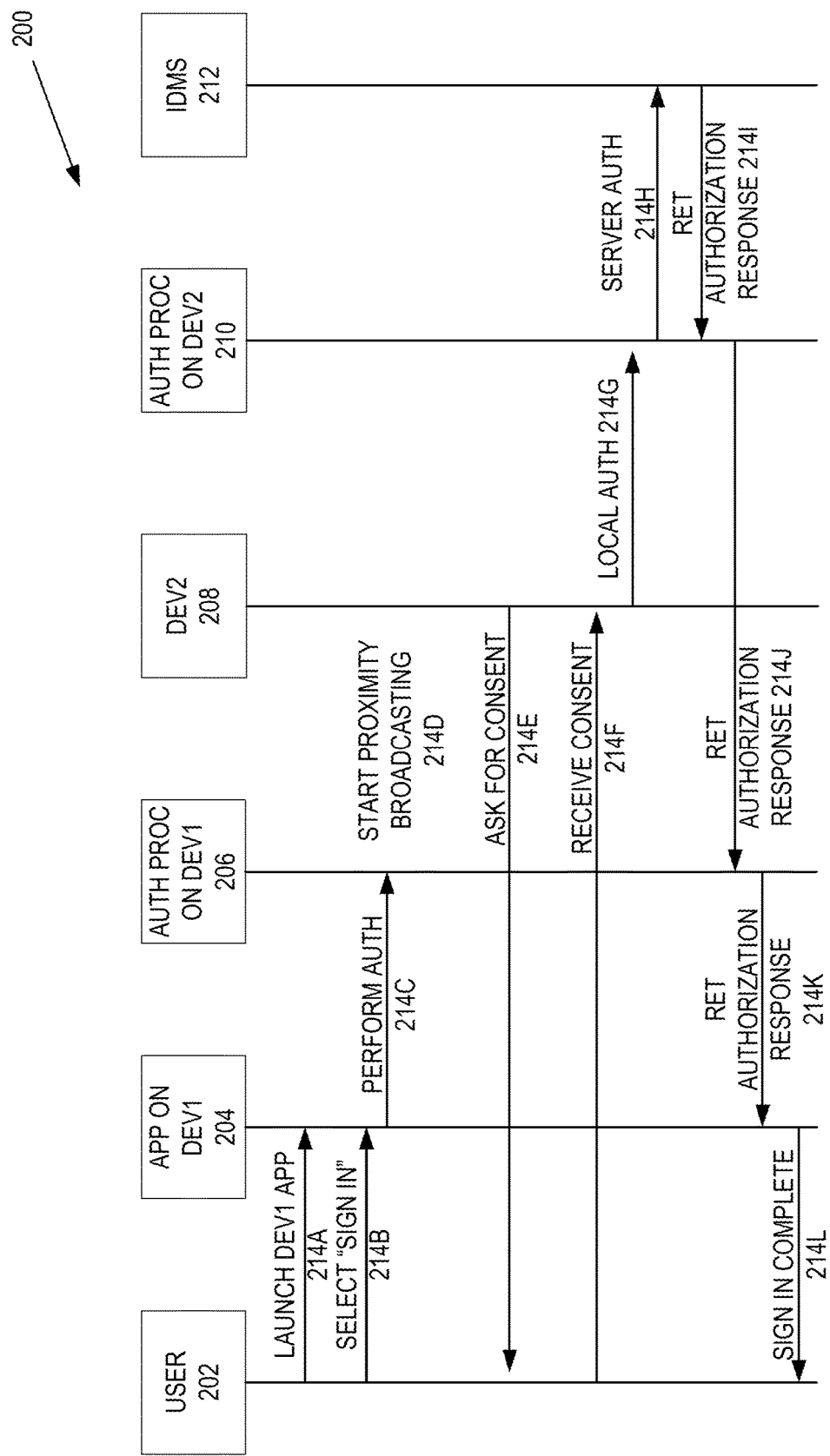

FIG. 2 is an illustration of one embodiment of a flow 200 for proximity single sign-on. In FIG. 2, the flow 200 begins by a user 202 launching (214A) an application on a first device 204. In one embodiment, the user 202 can launch application by directly invoking the application or invoking an application in an indirect manner (e.g., a user downloads a new application that is launched automatically, where this application requests an authorization in response to being launched using an application identifier, team identifier, and/or an icon). In addition, the user 202 selects a "sign-on" method. In one embodiment, the user 202 can be presented with an option via an application native mechanism (e.g., username and password) and/or a single sign-on mechanism using the user's global user identifier (e.g., "connect with XYZ"). If the user 202 selects the single sign-on mechanism (214B), the application 204 requests a proximity authorization (214C) and the authorization process 206 starts the proximity broadcasting (214D) on the first device. In this embodiment, the first device can start the proximity broadcasting as described in FIG. 1 above. In one embodiment, the second device 208 that is in proximity creates a secure channel with the first device 206. In response to the secure channel creation, the second device 206 asks for an authorization consent (214E) with the user of the device 206. In one embodiment, the second device 208 asks by presenting an authorization user interface on the second device 208. In response, the second device 208 receives user consent (214F) by the user 202 entering the user credentials via the authorization user interface (e.g., biometric authentication or a passcode). In one embodiment, the second device presents the authorization user interface and receives the user consent as described in FIG. 1 above. In this embodiment, by asking for and receiving consent by the user, the second device 208 is performing a local user authentication (214G) to authenticate the user as part of the authorization for the application 204 on the first device. In one embodiment, the local user authentication (214G) is used to have the user 202 identify them self with the second device, which subsequently used to authorize the application.

In a further embodiment, with the local user authentication performed by the second device 208, the authorization endorsing process 210 on the second device 208 sends a server authorization request (214H) to the identity management service 212. In one embodiment, the server authorization request serves to identify the user and second device to the identity management service 212 and to authorize the application 204 for the user 202. If the authorization is successful, the identity management service 212 returns an authorization response (214I) to the authorization endorsing process 210. In one embodiment, the authorization response includes an authorization code and a token. In one embodiment, the authorization code and token can be associated with an anonymous user identifier as described in U.S. patent application Ser. No. 16/888,461 entitled "SYSTEMS AND METHODS OF AN ANONYMOUS EMAIL RELAY", filed on May 29, 2020 which is incorporated by reference.

In one embodiment, the identity management service 212 returns an authorization response (214I) to the authorization endorsing process 210 as described in FIG. 1 above. The authorization endorsing process 210 returns the authorization response (214J) to the authorization requesting process 206. In turn, the authorization requesting process 206 returns the authorization response (214K) to the application 204, where the sign-on flow is complete.

Figure 3:
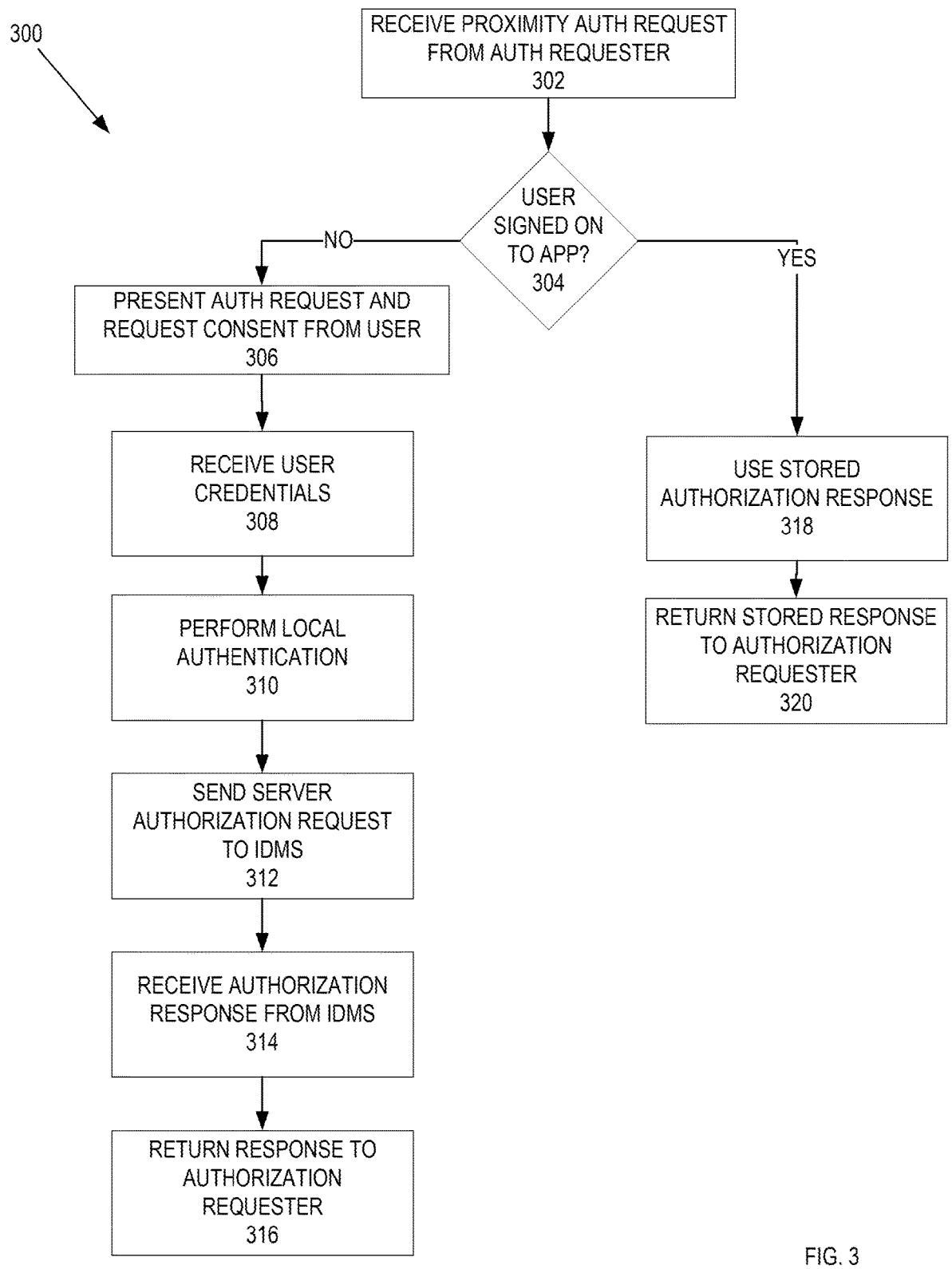
FIG. 3 is a flow diagram on one embodiment of a process to perform an authorization endorsement for an authorization requestor.

As described above, the second device receives an authorization request from the first device, where the second device performs a local user authentication for a user and requests a server authorization so as to authorize an application or service on the first device. FIG. 3 is a flow diagram on one embodiment of a process 300 to perform an authorization endorsement for an authorization requestor. In one embodiment, an authentication endorsing process performs process 300, such as the authentication endorsing process 112 as described in FIG. 1 above. In FIG. 3, process 300 begins by receiving a proximity authorization request from an authorization requesting device at block 302. In one embodiment, the proximity authorization request is a request for a local device within a threshold proximity to authorize an application or service that accessible on the authorization requesting device. For example and in one embodiment, process 300 receives the proximity authorization request as described in FIG. 1 above.

At block 304, process 300 checks if the user associated with the authorization requesting device and/or the requested application has already signed on through a single sign on service. In one embodiment, process 300 checks this against an application authorization cache. If the user is signed on, process 300 uses the stored authorization response at block 318. Process 300 returns the stored authorization response to the authorization requester at block 320.

If the user has not already signed on for the application, process 300 prompts the user with a user authorization request to a user, so as to request consent for an authorization for the application at block 306. In one embodiment, process 300 presents the user authorization request to a user using an authorization user interface as requested in FIG. 1 above. Process 300 receives the user credentials at block 308. In one embodiment, the user credentials can be a biometric data received from sensors (e.g., face data, touch data, etc.), a passcode, username and password, and/or some other type of user credential. With the user credentials, at block 310, process 300 performs a local user authentication. In one embodiment, process 300 performs the local user authentication as described in FIG. 1 above. If the local user authentication is successful, process 300 sends a server authorization request to an identity management server at block 312. In one embodiment, process 300 sends a SRP request, where this request is used to identify the user and device that sent the server request to the identity management service and to authorize the application for the user. For example and in one embodiment, process sends the server authorization request as described in FIG. 1 above.

Process 300 receives an authorization response from the identity management service at block 314. In one embodiment, the authorization response indicates whether the authorization for the application is successful or not. For example and in one embodiment, process 300 receives the authorization response as described in FIG. 1 above. Process 300 returns the authorization response to the authorization requesting device at block 316. In one embodiment, returning the authorization response indicates to the authorization requesting device whether the authorization is successful or not. For example and in one embodiment, process 300 returns the authorization response as described in FIG. 1 above. In one embodiment, this sequence may establish the anonymous user identifier for use with the applications. For a subsequent request, the anonymous identity token and authorization code are stored in an application authorization cache on the authorization requesting device and the proximity sign on (or another type of sign on for the application) is not needed until the user signs out of the application.

Figure 4:
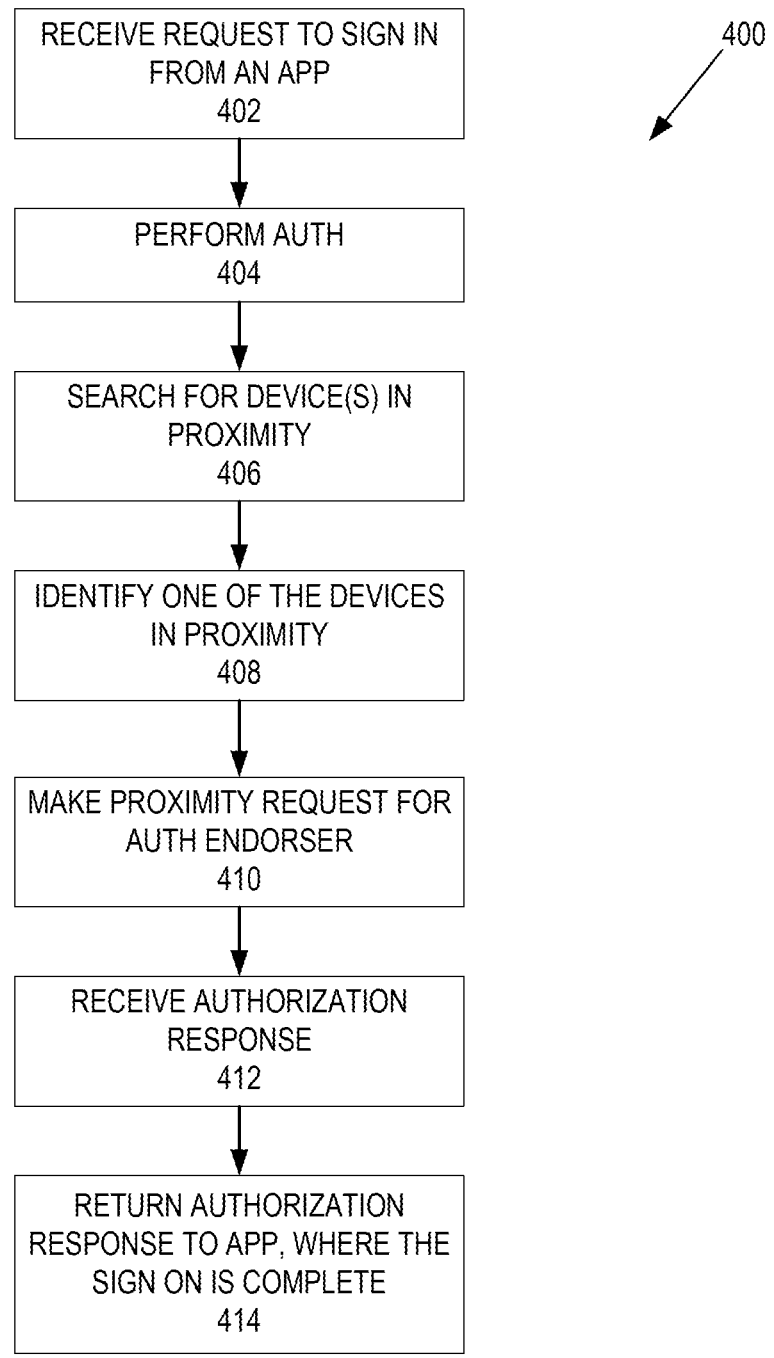
FIG. 4 is a flow diagram on one embodiment of a process to request an authorization to an authorization endorsing device.

In FIG. 3, the authorization endorsing device endorses an authorization for an application or service in response to a received proximity authorization request from an authorization requesting device. FIG. 4 is a flow diagram on one embodiment of a process 400 to request an authorization to an authorization endorsing device. In one embodiment, process 400 is performed by the authorization requesting process, such as the authorization requesting process 112 executing on an authorization requesting device 110 as described in FIG. 1 above. In FIG. 4, process 400 begins by receiving a request to sign-on from an application at block 402. In one embodiment, the application sends a sign-on request in response to a user selecting a single sign service as a mechanism to perform an authorization for the application. For example and in one embodiment, the single sign-on request is generated in response to a user selecting a button labeled as "sign-on with XYZ," where XYZ is the single sign-on service.

At block 404, process 400 performs the proximity authorization. In one embodiment, the proximity authorization is a mechanism to authorize the use of the application or service for the user on the authorization requesting device by using another device that is in proximity (e.g., the authorization endorsing device). Process 400 starts a proximity broadcast for local devices that can perform the authorization at block 406. In one embodiment, process 400 starts a proximity broadcast using a discovery protocol as described in FIG. 1 above. At block 408, process 400 identifies one of the devices in proximity as being able to handle the proximity authorization request. In one embodiment, process 400 receives a handshake from a local device that identifies itself as being able to handle the request, where the two devices create a secure channel for communication. If there are multiple devices that send a handshake, process 400 selects the first received handshake as the device to perform the proximity authorization. In one embodiment, process 400 identifies one of the devices in proximity as described in FIG. 1 above.

At block 410, process 400 performs a proximity authorization request to the local device. In one embodiment, the proximity authorization request is used to receive an authorization via the local device. In this embodiment, the local device is the authorization endorsing device. Process 400 receives the authorization response at block 412. In one embodiment, process 400 receives the authorization request as described in FIG. 1 above. At block 414, process 400 returns the authorization response to the application, wherein the sign-on is complete. In one embodiment, returns process 400 the authorization request as described in FIG. 1 above, which can include the authorization code and token. In one embodiment, the application verifies the authorization response. With the authorization response verified, the user can use the application on the authorization requesting device.

FIGS. 5A-C are illustrations of embodiments of a user interface on the authorization endorsing device for a proximity sign-on. In FIG. 5A, the user interface 500 presents a notification banner 502 along with a device application user interface 504. In one embodiment, the notification banner 502 is presented in response to the authorization endorsing device receiving an application sign in request via a discovery protocol from authorization requesting device (e.g. the authorization requesting device 102 as described in FIG. 1). If the user taps the notification banner 502, an authorization user interface 520 is presented on the authorization endorsing device as illustrated in FIG. 5B. In one embodiment, user interface 520 displays a message informing the user of the device (e.g., "Rick's Digital Media Player") and the application (e.g., "Stream Now") that is requesting authorization with the authorization endorsing device. The authorization user interface 520 further includes a user interface component 526 that allows the user to enter their user credentials. If the user's entered credentials are successful for authorization, a message indicating success may be presented, as illustrated in FIG. 5C. In FIG. 5C, a success message 542 is presented on the user interface 540.

Figure 6:
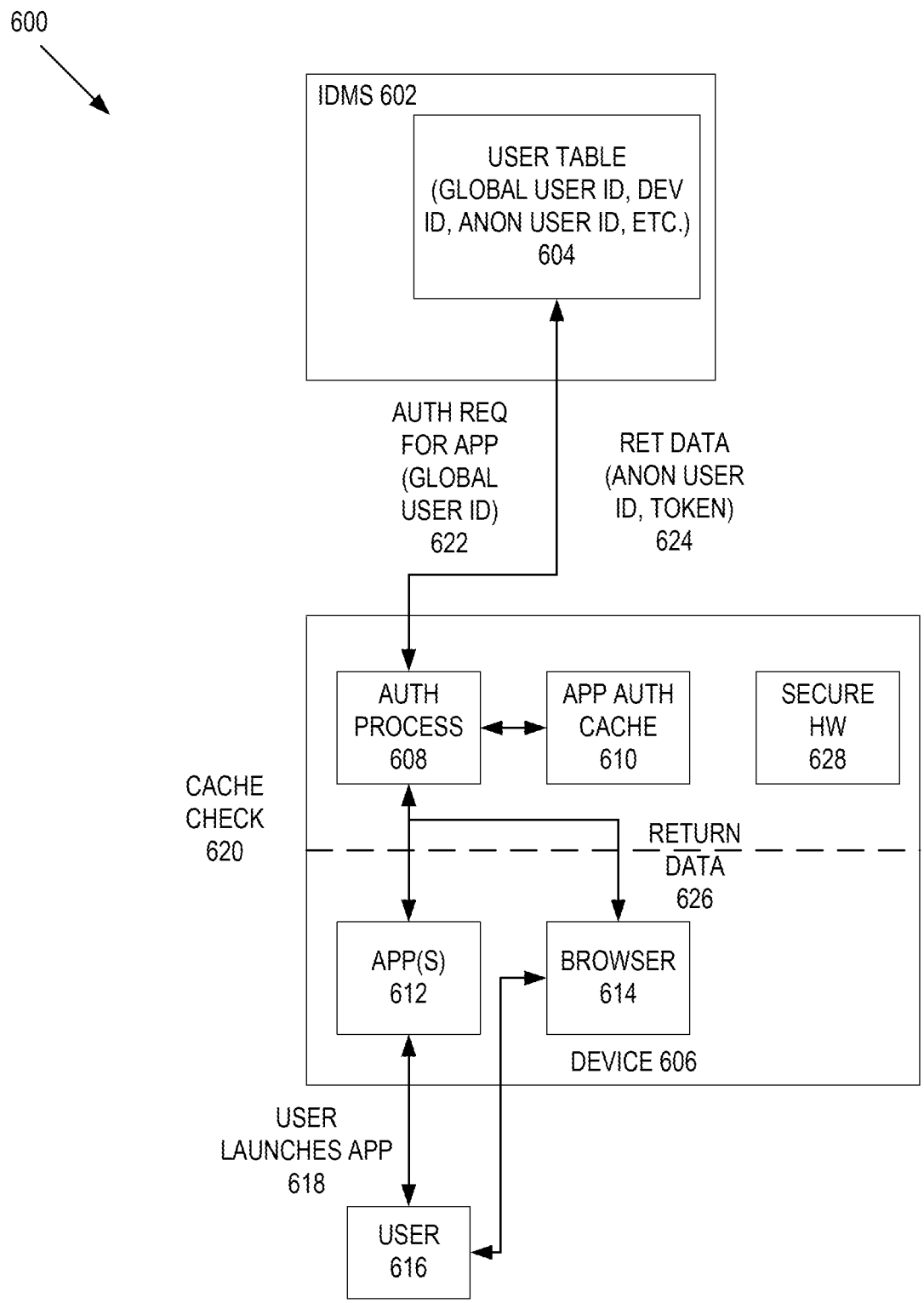
FIG. 6 is an illustration of one embodiment of a system for caching the application information.

FIG. 6 is an illustration of one embodiment of a system 600 for caching the application authorization information. In FIG. 6, the device 606 is coupled to an identity management service 602. In one embodiment, the identity management service 602 is the identity management service 102 that is described in FIG. 1 above. Furthermore, device 606 can be either the authorization requesting device 102 and/or the authorization endorsing device 110 as described in FIG. 1 above. In addition, device 606 is trusted by the identity management service 602 because of an established trust relationship between the device 606 and the identity management service 602 that was established by two-factor authentication. In this embodiment, the device 606 can be any type of device that can execute an application (e.g., smart phone, laptop, personal computer, digital media device, television, server, tablet, wearable, vehicle component, and/or any type of device that can process instructions of an application). The device 606 further includes one or more applications 612, a browser 614, an authorization process 608, an application authorization cache 610, and secure hardware 628. In one embodiment, the one or more applications 612 are each an embodiment of software that runs on the device 606 and can perform a variety of functions. Furthermore, in this embodiment, the browser 614 can be a web browser that can make and receive requests for data over a network coupled to device 606. In this embodiment, the authorization process 608 is a process that is not a process or a child process for either the application(s) 612 or the browser 614.

The device 606 additionally includes an authorization process 608 that communicates with the identity management service 602 for the one or more applications 612 or the browser 614. In particular, the authorization process 608 determines if the user 616 is authorized for the one or more applications 612 or the browser 614 using the application authorization cache 610 and/or the identity management service 602. In one embodiment, the user launches (618) an application 612. The authorization process 608 detects the launch of the application 612 and checks (620) the application authorization cache 610 to determine if the user 616 had previously signed on with the application 612 via the identity management service 602. If the application 612 is in the application authorization cache 610, the application 612 continues to launch, where the application 612 is configured for use with the private relay and the anonymous user email address.

If the application 612 is not in the application authorization cache 610, the authorization process 608 sends an authorization request (622) for the application 612. In one embodiment, the authorization request (622) includes data that is used for the request, such as the global user identifier, developer identifier for the application 612, one or more tokens generated on the device 606, and/or other information used for the authorization request. The identity management server 602 includes a user table that associates the global user identifier, developer identifier, anonymous user identifier, and/or other information used by the identity management service 602 for that combination of user and developer. In this embodiment, the developer identifier for an application is generated when a developer associated with one of the applications 612 registers that application 612 with the identity management service 602. Furthermore, the anonymous user identifier is generated when the user signs-on for an application, where the anonymous user identifier is tied to the global user identifier and the developer identifier.

In response to receiving the authorization request, the identity management server 602 returns the local data (e.g., anonymous user identifier, application token, and/or other information used by the authorization process on the device) (624) to the authorization process 608 of the device 606. In one embodiment, some or all of the local data can be stored in the application authorization cache 610. The authorization process 608, in turn, returns this data to the application 612. In one embodiment, the identity management service 602 refreshes the application authorization cache 610 for each time period (e.g., every 24 hours), on demand from the application, request from a user, pushed out based on user activity on other devices (e.g., a user signs on or off on a different device), a dynamic schedule, and/or another type of schedule. In a further embodiment, if a user 616 explicitly signs out of the application 612 on one device, the identity management service 602 detects this sign out and pushes out the sign out to other devices of the user 616. For example and in one embodiment, if the user 616 signs out of an application 612 on a smartphone, the identity management service 602 pushes out a sign out for this application 612 on the other user 616 devices (e.g., the user's tablet or laptop). Alternatively, if the user 616 signs into an application on one device, this sign on information is pushed out to the user's other devices.

As described above, in FIG. 6, the device 606 sends an authorization request for an application to the identity management service 602 if the authorization information for the application 612 is not stored in application authorization cache 610. In one embodiment, by using the application authorization cache 610, the device 606 can shield the user's private information from the developer by use of a local cache (e.g., the application authorization cache 610). This is because the identity management server does not track user sign-ons to or launches of the application 612. In one embodiment, the device 606 further includes secure hardware 628. In this embodiment, the secure hardware 628 is used to for local user authentication of the user 616 for the device 606 (e.g. via pincode, biometric credentials, and/or other types of authentication data).

Figure 7:
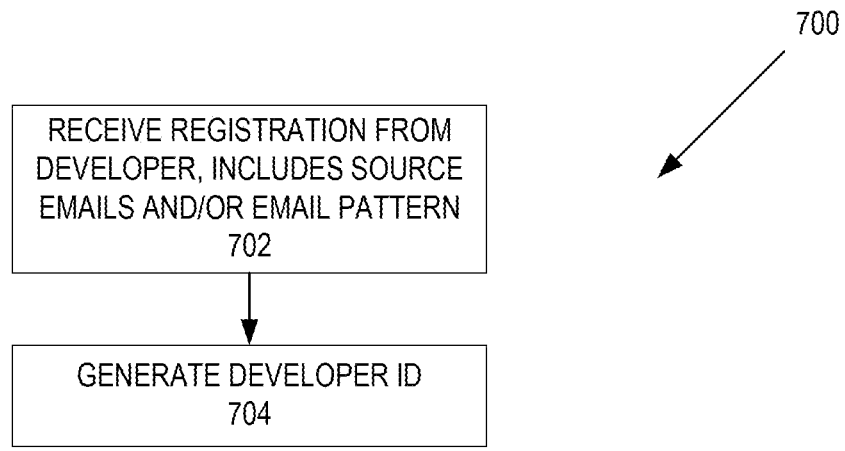
FIG. 7 is a flow diagram of one embodiment of a process to register a developer.

FIG. 7 is a flow diagram of one embodiment of a process 700 to register a developer. In FIG. 7, process 700 begins by receiving a registration from the developer that includes information regarding developer source email addresses and/or allowed email patterns at block 702. In one embodiment, each developer has an associated identifier that is used in the sign-on processes, such as the proximity sign on described above. At block 704, process 700 generates the developer identifier that can be used with a user sign-in to create a long-lived for one of the developer's applications.

Figure 8:
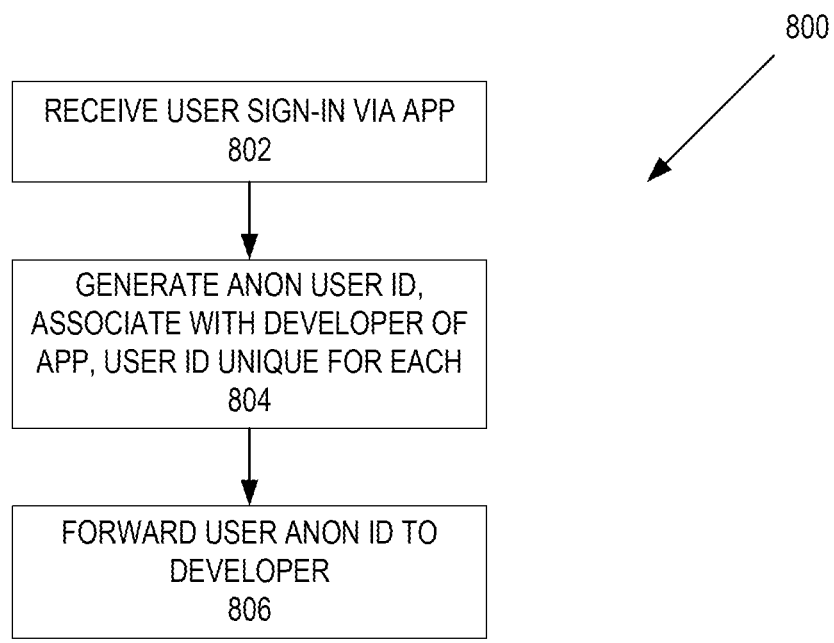

FIG. 8 is a flow diagram of one embodiment of a process to handle a user sign on for an application. In FIG. 8, process 800 begins by receiving an indication of user sign in via the application at block 802. In one embodiment, the user sign in can include the user's global user identifier or another identifier tied to global user identifier (e.g., a secondary email address for the user). Alternatively, the user can permit access to a password management system to allow the use of the user's password for the global user identifier without the user having to enter tis password. At block 804, process 800 generates the anonymous user identifier and associates this identifier with the developer identifier of the application. In one embodiment, the anonymous user identifier is associated with a developer identifier and is unique within the authorization domain of the identity management service. In a further embodiment, the anonymous user identifier and the developer identifier are stored in a table along with other information for this relationship (e.g., anonymized user email address, the user's real email address, what private information to share, and other information used to maintain this association). Process 800 additionally forwards the user anonymous identifier, the anonymized user email address, and possible non-private user information to the developer at block 806.

In one embodiment, the developer can use the anonymous user identifier to track the actions of the user within the application of the developer that the user has performed a sign-on. In this embodiment, when the user signs on with the application, the developer can track the actions the user performed with the application (e.g., ordered merchandise, streamed media, browsing with the application, and/or other types of actions with the developer's application). Thus, the developer can use the anonymized user email address and the tracked information about the user to send targeted email to the user. In one embodiment, however, because the application authorization cache is stored on the device and not on a remote server, the developer cannot retrieve information on how the user uses applications that are not associated with the developer. In this embodiment, the user's application usage that is outside of the developer is shielded from the developer.

Figure 9:
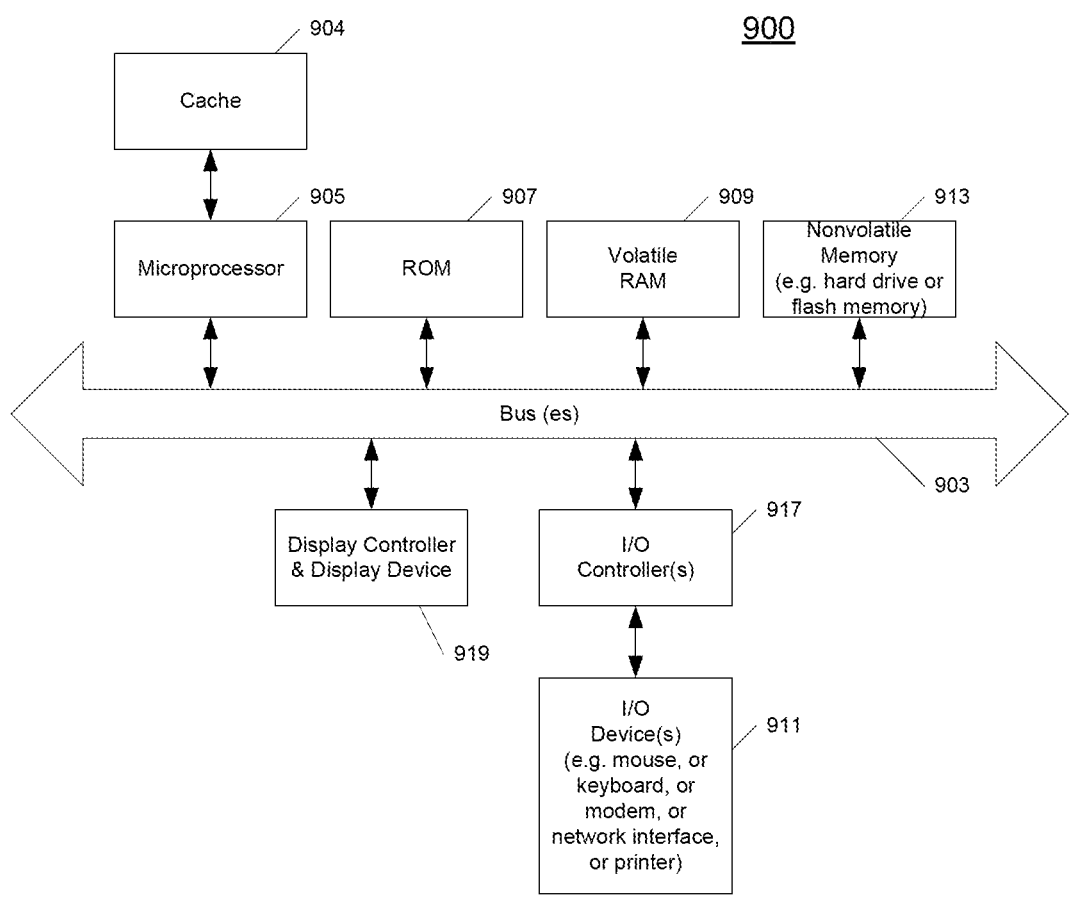
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented as a system that includes an authorization requesting device 102 and/or authorization endorsing device 110 as shown in FIG. 1 above. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 909 and a ROM (Read Only Memory) 907 and volatile RAM 909 and a non-volatile memory 911. The microprocessor 909 may include one or more CPU(s), GPU(s), a specialized processor, and/or a combination thereof. The microprocessor 909 may retrieve the instructions from the memories 907, 909, 911 and execute the instructions to perform operations described above. The bus 903 interconnects these various components together and also interconnects these components 909, 907, 909, and 911 to a display controller and display device 919 and to peripheral devices such as input/output (I/O) devices which may be mice, keyboards, modems, network interfaces, printers and other devices which are well known in the art. Typically, the input/output devices 919 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD RAM or a flash memory or other types of memory systems, which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Figure 10:
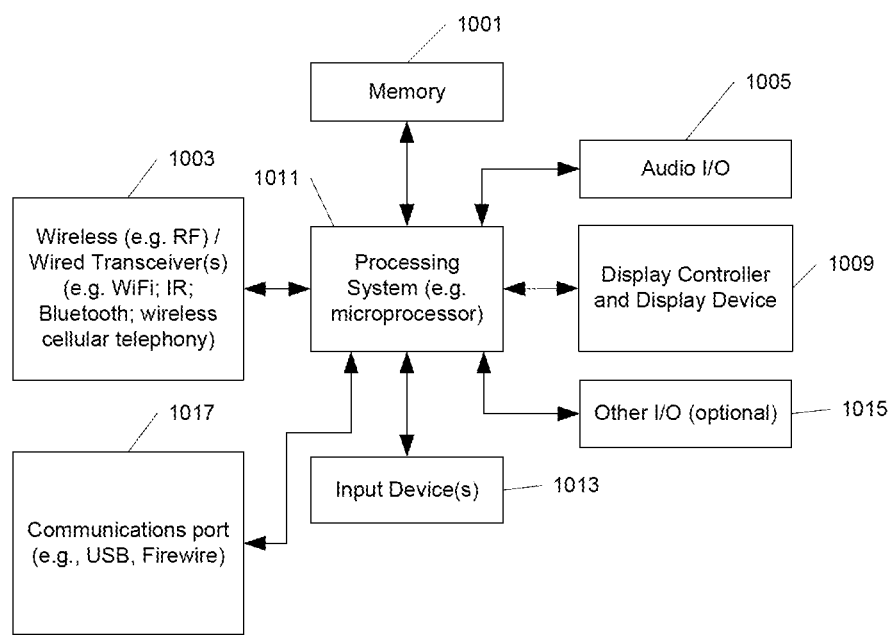
FIG. 10 shows an example of a data processing system, which may be used with one embodiment of the present invention.

FIG. 10 shows an example of another data processing system 1000 which may be used with one embodiment of the present invention. For example, system 1000 may be implemented as either the authorization requesting device 102 or authorization endorsing device 110 as shown in FIG. 1 above. The data processing system 1000 shown in FIG. 6 includes a processing system 1011, which may be one or more microprocessors, or which may be a system on a chip integrated circuit, and the system also includes memory 1001 for storing data and programs for execution by the processing system. The system 1000 also includes an audio input/output subsystem 1005, which may include a microphone and a speaker for, for example, playing back music or providing telephone functionality through the speaker and microphone.

A display controller and display device 1009 provide a visual user interface for the user; this digital interface may include a graphical user interface which is similar to that shown on a Macintosh computer when running OS X operating system software, or Apple iPhone when running the iOS operating system, etc. The system 1000 also includes one or more wireless transceivers 1003 to communicate with another data processing system, such as the system 9000 of FIG. 9. A wireless transceiver may be a WLAN transceiver, an infrared transceiver, a Bluetooth transceiver, and/or a wireless cellular telephony transceiver. It will be appreciated that additional components, not shown, may also be part of the system 1000 in certain embodiments, and in certain embodiments fewer components than shown in FIG. 10 may also be used in a data processing system. The system 1000 further includes one or more communications ports 1017 to communicate with another data processing system, such as the system 900 of FIG. 9. The communications port may be a USB port, Firewire port, Bluetooth interface, etc.

The data processing system 1000 also includes one or more input devices 1013, which are provided to allow a user to provide input to the system. These input devices may be a keypad or a keyboard or a touch panel or a multi touch panel. The data processing system 1000 also includes an optional input/output device 1015 which may be a connector for a dock. It will be appreciated that one or more buses, not shown, may be used to interconnect the various components as is well known in the art. The data processing system shown in FIG. 10 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1000 may be a network computer or an embedded processing device within another device, or other types of data processing systems, which have fewer components or perhaps more components than that shown in FIG. 10.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, CA, a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "presenting," "performing," "sending," "returning," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to endorse a proximity authorization for an authorization requesting device, the method comprising:
   receiving, with an authorization endorsing device from the authorization requesting device, a service discovery protocol advertisement that is an advertisement for an application sign in, the service discovery protocol advertisement was sent in response to an indication received on the authorization requesting device that an application is to be authorized using a single sign-on service, the authorization endorsing device and the authorization requesting device are communicatively coupled through a local network, another device receives the service discovery protocol advertisement through the local network, and the single sign-on service authorizes the user to sign-on with one or more different services including the application across different authorization domains using a single set of credentials and without sharing the private information by using an anonymous email relay;
   in response to receiving the service discovery protocol advertisement, sending a response that indicates that the authorization endorsing device can authorize the application;
   receiving, with the authorization endorsing device, a proximity authorization request from the authorization requesting device, wherein the authorization requesting device is in proximity with the authorization endorsing device, the proximity authorization request is an authorization request for an application and includes an indication of an application name, wherein the authorization requesting device is a digital media device that lacks a biometric receiver for physically entering a set of user credentials;
   presenting a local authorization request to a user of the authorization endorsing device, wherein the local authorization request is for a single sign-on authorization service, and the local authorization request includes the application name;
   receiving set of user credentials for the local authorization request;
   performing a local authorization on the authorization endorsing device using at least the set of user credentials;
   sending, by the authorization endorsing device, a server authorization request to an identity management server;
   receiving, by the authorization endorsing device, an authorization response from the identity management server; and
   returning, by the authorization endorsing device, the authorization response to the authorization requesting device.

2. The non-transitory machine-readable medium of claim 1, wherein the authorization requesting device is in proximity with the authorization endorsing device when the authorization requesting device is within a geographic proximity to the authorization endorsing device.

3. The non-transitory machine-readable medium of claim 1, wherein the authorization requesting device is a device is executing an application requesting an authorization for a service.

4. The non-transitory machine-readable medium of claim 3, wherein the proximity authorization request is an authorization request associated with the application.

5. The non-transitory machine-readable medium of claim 1, wherein the authorization endorsing device is a device that includes a component for receiving the user credentials from the user.

6. The non-transitory machine-readable medium of claim 1, wherein the user credentials are selected from the group consisting of biometric user credentials, a passcode, or a username and password.

7. The non-transitory machine-readable medium of claim 6, wherein the authorization endorsing device is a mobile device.

8. The non-transitory machine-readable medium of claim 1, wherein the authorization requesting device is selected from the group consisting of a digital media player, gaming console, laptop, television, smart device, wearable, mobile device, and vehicle component.

9. The non-transitory machine-readable medium of claim 1, wherein the authorization response includes at least one of an authorization code and an identity token.

10. The non-transitory machine-readable medium of claim 1, wherein the server authorization request is a secure remote password authorization request.

11. The non-transitory machine-readable medium of claim 1, wherein each of the authorization requesting device and the authorization endorsing device are associated with a user identity.

12. A non-transitory machine-readable medium having executable instructions to cause one or more processing units to perform a method to request a proximity authorization by an authorization requesting device, the method comprises:

receiving, with an authorization requesting device, an application single sign-on request;

searching for an authorization endorsing device in proximity with the authorization requesting device using a service discovery protocol advertisement that is an advertisement for an application sign in and the service discovery protocol advertisement was sent in response to the receiving of the application single sign-on request, wherein the authorization requesting device is a digital media device that lacks a biometric receiver for physically entering a set of user credentials, the authorization endorsing device and the authorization requesting device are communicatively coupled through a local network, and another device receives the service discovery protocol advertisement through the local network;

receiving a response that indicates that the authorization endorsing device can authorize the application;

sending a proximity authorization request to the authorization endorsing device, wherein the proximity authorization request is an authorization request for an application and includes an indication of an application name, and the authorization endorsing device uses a single sign-on service to process the proximity authorization request, wherein the single sign-on service authorizes the user to sign-on with one or more different services including the application across different authorization domains using a single set of credentials and without sharing the private information by using an anonymous email relay;

receiving, from the authorization endorsing device, an application authorization response; and returning an application authorization response to the application.

13. A method to endorse a proximity authorization for an authorization requesting device, the method comprising:

receiving, with an authorization endorsing device from the authorization requesting device on a local network, a service discovery protocol advertisement that is an advertisement for an application sign in and the service discovery protocol advertisement was sent in response to an indication received on the authorization requesting device that an application is to be authorized using a single sign-on service, the authorization requesting device and the authorization endorsing device are communicatively coupled through a local network, and another device receives the service discovery protocol advertisement through the local network, and the single sign-on service authorizes the user to sign-on with one or more different services including the application across different authorization domains using a single set of credentials and without sharing the private information by using an anonymous email relay;

in response to receiving the service discovery protocol advertisement, sending a response that indicates that the authorization endorsing device can authorize the application;

receiving, with the authorization endorsing device, a proximity authorization request from the authorization requesting device, wherein the authorization requesting device is in proximity with the authorization endorsing device and the proximity authorization request is an authorization request for an application and includes an indication of an application name, the proximity authorization request is an authorization request for an application, wherein the authorization requesting device is a digital media device that lacks a biometric receiver for physically entering a set of user credentials;

presenting a local authorization request to a user of the authorization endorsing device, wherein the local authorization request is for a single sign-on authorization service, and the local authorization request includes the application name;

receiving set of user credentials for the local authorization request;

performing a local authorization on the authorization endorsing device using at least the set of user credentials;

sending, by the authorization endorsing device, a server authorization request to an identity management server;

receiving, by the authorization endorsing device, an authorization response from the identity management server; and returning, by the authorization endorsing device, the authorization response to the authorization requesting device.

14. The method of claim 13, wherein the authorization requesting device is in proximity with the authorization endorsing device when the authorization requesting device is within a geographic proximity to the authorization endorsing device.

15. The method of claim 13, wherein the authorization requesting device is a device is executing an application requesting an authorization for a service.

16. The method of claim 15, wherein the proximity authorization request is an authorization request associated with the application.

17. The method of claim 13, wherein the authorization endorsing device is a device that includes a component for receiving the user credentials from the user.

18. The method of claim 13, wherein the user credentials are selected from the group consisting of biometric user credentials, a passcode, or a username and password.

19. The method of claim 18, wherein the authorization endorsing device is a mobile device.

20. The method of claim 13, wherein the authorization requesting device is selected from the group consisting of a digital media player, gaming console, laptop, television, smart device, wearable, mobile device, and vehicle component.

21. The method of claim 13, wherein the authorization response includes at least one of an authorization code and an identity token.

22. The method of claim 13, wherein the server authorization request is a secure remote password authorization request.

23. The method of claim 13, wherein each of the authorization requesting device and the authorization endorsing device are associated with a user identity.

24. A method to request a proximity authorization by an authorization requesting device, the method comprises:

receiving, with an authorization requesting device, an application sign-on request;

searching for an authorization endorsing device in proximity with the authorization requesting device using a service discovery protocol advertisement that is an advertisement for an application sign in and the service discovery protocol advertisement was sent in response to the receiving of the application single sign-on request, wherein the authorization requesting device is a digital media device that lacks a biometric receiver for physically entering a set of user credentials, the authorization endorsing device and the authorization requesting device are communicatively coupled through a local network, and another device receives the service discovery protocol advertisement through the local network;

receiving a response that indicates that the authorization endorsing device can authorize the application;

sending a proximity authorization request to the authorization endorsing device, wherein the proximity authorization request is an authorization request for an application and includes an indication of an application name, and the authorization endorsing device uses a single sign-on service to process the proximity authorization request, wherein the single sign-on service authorizes the user to sign-on with one or more different services including the application across different authorization domains using a single set of credentials and without sharing the private information by using an anonymous email relay;

receiving, from the authorization endorsing device, the application authorization response; and returning an application authorization response to the application.

* * * * *

UNITED STATES PATENT AND TRADEMARK OFFICE
CERTIFICATE OF CORRECTION

PATENT NO. : 12,299,107 B2
APPLICATION NO. : 16/888482
DATED : May 13, 2025
INVENTOR(S) : Felipe Marin Cypriano et al.

It is certified that error appears in the above-identified patent and that said Letters Patent is hereby corrected as shown below:

In the Claims

In Column 20, Line 36: Claim 3, please delete "device is a device is" and insert --device is a device--.

In Column 22, Line 32: Claim 15, please delete "device is a device is" and insert --device is a device--.

Signed and Sealed this
First Day of July, 2025

Coke Morgan Stewart
*Acting Director of the United States Patent and Trademark Office*